(12) United States Patent
Hikita et al.

(10) Patent No.: US 11,033,864 B2
(45) Date of Patent: Jun. 15, 2021

(54) POROUS MEMBRANE

(71) Applicant: Mitsubishi Chemical Corporation, Chiyoda-ku (JP)

(72) Inventors: Shingo Hikita, Tokyo (JP); Masashi Teramachi, Tokyo (JP); Ami Shinoda, Tokyo (JP); Naotaka Suenaga, Tokyo (JP); Hiroki Fukuta, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 32 days.

(21) Appl. No.: 15/574,305

(22) PCT Filed: May 27, 2016

(86) PCT No.: PCT/JP2016/065734
§ 371 (c)(1),
(2) Date: Nov. 15, 2017

(87) PCT Pub. No.: WO2016/190416
PCT Pub. Date: Dec. 1, 2016

(65) Prior Publication Data
US 2018/0290110 A1    Oct. 11, 2018

(30) Foreign Application Priority Data

May 27, 2015    (JP) .............. JP2015-106985

(51) Int. Cl.
*B01D 71/40*    (2006.01)
*B01D 69/02*    (2006.01)
(Continued)

(52) U.S. Cl.
CPC .......... *B01D 71/40* (2013.01); *B01D 67/0011* (2013.01); *B01D 67/0013* (2013.01);
(Continued)

(58) Field of Classification Search
CPC .......... B01D 67/0011; B01D 67/0013; B01D 67/0016; B01D 69/02; B01D 69/06;
(Continued)

(56) References Cited

U.S. PATENT DOCUMENTS

| 6,413,621 B1 * | 7/2002 | Mayes ............... B01D 67/0011 428/212 |
| 2007/0029256 A1 * | 2/2007 | Nakano ............... A61M 1/3633 210/641 |

(Continued)

FOREIGN PATENT DOCUMENTS

| JP | 2006-205067 A | 8/2006 |
| JP | 2007-723 A | 1/2007 |

(Continued)

OTHER PUBLICATIONS

Extended European Search Report dated Mar. 13, 2018 in Patent Application No. 16800120.4, 12 pages.
(Continued)

*Primary Examiner* — James C Goloboy
(74) *Attorney, Agent, or Firm* — Oblon, McClelland, Maier & Neustadt, L.L.P.

(57) ABSTRACT

A porous membrane comprising a membrane-forming polymer (A) and a polymer (B) containing a methyl methacrylate unit and a hydroxyl group-containing (meth)acrylate (b1) unit. A flux of pure water to permeate the porous membrane is preferably 10 ($m^3/m^2/MPa/h$) or more and less than 200 ($m^3/m^2/MPa/h$). The contact angle of the bulk of the membrane-forming polymer (A) is preferably 60° or more. The membrane-forming polymer (A) is preferably a fluorine-containing polymer. The polymer (B) is preferably a random copolymer.

24 Claims, 1 Drawing Sheet

(51) Int. Cl.

| | | |
|---|---|---|
| *C08F 220/28* | (2006.01) | |
| *C08J 9/28* | (2006.01) | |
| *B01D 67/00* | (2006.01) | |
| *B01D 69/06* | (2006.01) | |
| *B01D 69/08* | (2006.01) | |
| *B01D 71/80* | (2006.01) | |
| *C08L 27/12* | (2006.01) | |
| *C08L 33/12* | (2006.01) | |
| *C08F 220/14* | (2006.01) | |
| *C08J 9/00* | (2006.01) | |
| *B01D 71/32* | (2006.01) | |
| *B01D 71/34* | (2006.01) | |

(52) U.S. Cl.
CPC ......... *B01D 67/0016* (2013.01); *B01D 69/02* (2013.01); *B01D 69/06* (2013.01); *B01D 69/08* (2013.01); *B01D 71/80* (2013.01); *C08F 220/14* (2013.01); *C08F 220/28* (2013.01); *C08J 9/0061* (2013.01); *C08J 9/28* (2013.01); *C08L 27/12* (2013.01); *C08L 33/12* (2013.01); *B01D 71/32* (2013.01); *B01D 71/34* (2013.01); *B01D 2323/02* (2013.01); *B01D 2323/12* (2013.01); *B01D 2323/22* (2013.01); *B01D 2323/30* (2013.01); *B01D 2323/32* (2013.01); *B01D 2325/02* (2013.01); *B01D 2325/36* (2013.01); *C08F 220/281* (2020.02); *C08F 220/286* (2020.02); *C08J 2205/042* (2013.01); *C08J 2205/044* (2013.01); *C08J 2333/12* (2013.01); *C08J 2333/14* (2013.01); *C08J 2427/16* (2013.01)

(58) Field of Classification Search
CPC ........ B01D 69/08; B01D 71/32; B01D 71/34; B01D 71/40; B01D 71/80; B01D 2323/02; B01D 2323/12; B01D 2323/22; B01D 2323/30; B01D 2325/02; B01D 2325/36; C08F 220/281; C08F 220/286; C08J 9/0061; C08J 9/28; C08J 2205/042; C08J 2205/044; C08J 2333/12; C08J 2333/14; C08J 2427/16; C08L 27/12; C08L 33/12

See application file for complete search history.

(56) References Cited

U.S. PATENT DOCUMENTS

| | | | |
|---|---|---|---|
| 2015/0270523 A1* | 9/2015 | Toyoda | H01M 2/145 |
| | | | 429/145 |
| 2015/0343392 A1 | 12/2015 | Hikita et al. | |
| 2016/0030896 A1 | 2/2016 | Lorain et al. | |
| 2016/0038884 A1* | 2/2016 | Hikita | C09D 133/04 |
| | | | 210/500.23 |

FOREIGN PATENT DOCUMENTS

| | | | |
|---|---|---|---|
| JP | 2007-182571 A | 7/2007 | |
| JP | 2008-229612 A | 10/2008 | |
| JP | 2015-58419 A | 3/2015 | |
| JP | 2016-13539 A | 1/2016 | |
| WO | WO 2014/098234 A1 | 6/2014 | |
| WO | WO 2014/139977 A1 | 9/2014 | |
| WO | WO 2014/142311 A1 | 9/2014 | |
| WO | WO-2014142311 A1 * | 9/2014 | .......... C09D 133/04 |

OTHER PUBLICATIONS

Fu Liu, et al., "Preparation of hydrophilic and fouling resistant poly(vinylidene fluoride) hollow fiber membranes", Journal of Membrane Science, vol. 345, No. 1-2, XP026675640, 2009, pp. 331-339.

International Search Report dated Aug. 2, 2016 in PCT/JP2016/065734 filed May 27, 2016.

European Office Action dated Dec. 17, 2018 in European Patent Application No. 16800120.4, 6 pages.

Office Action dated Sep. 10, 2019 in European Patent Application No. 16800120.4.

Combined Office Action and Search Report dated Jan. 3, 2020 in Chinese Patent Application No. 201680026460.9 (with English machine translation obtained from the Global Dossier on Jan. 29, 2020 and English translation of categories of cited references).

* cited by examiner

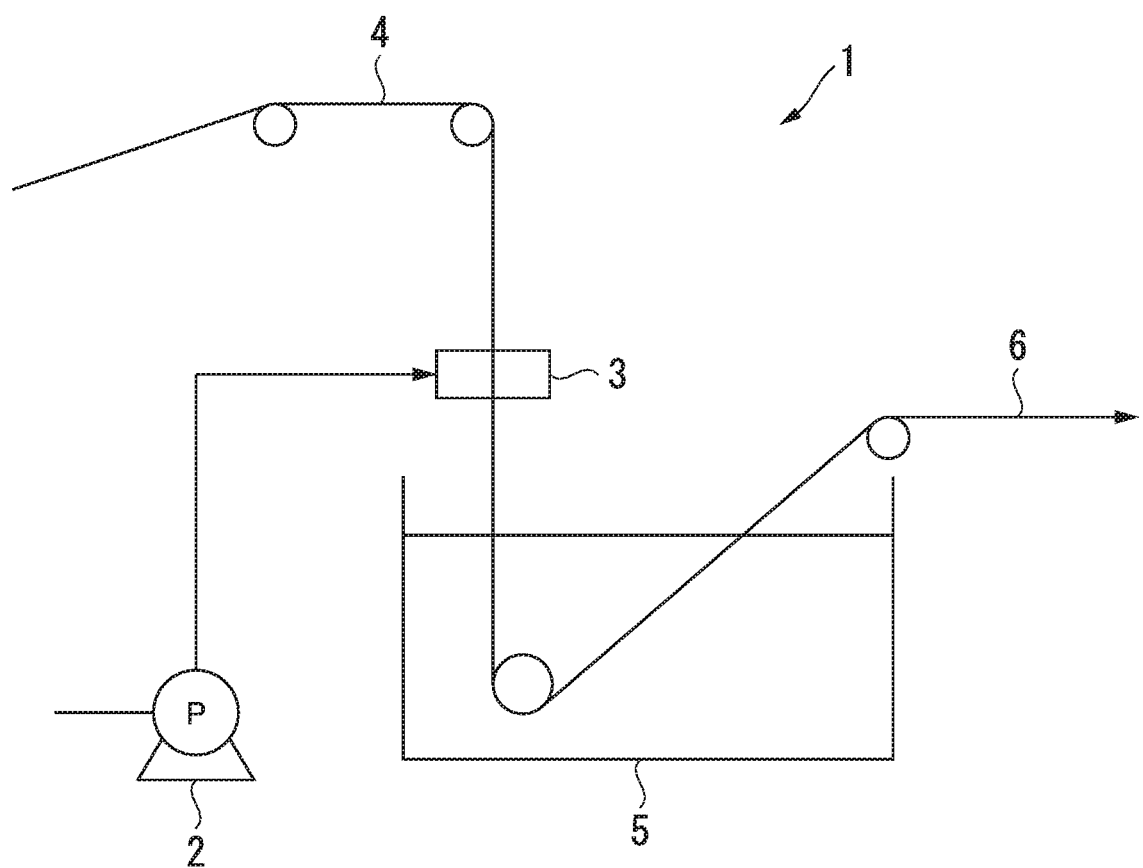

POROUS MEMBRANE

TECHNICAL FIELD

The present invention relates to a porous membrane.

This application is based upon and claims the benefit of priority of the prior Japanese Patent Application No. 2015-106985 filed in Japan on May 27, 2015, the entire contents of which are incorporated herein by reference.

BACKGROUND ART

Porous membranes are utilized in various fields such as water treatment fields including drinking water production, water purification treatment, and wastewater treatment.

In recent years, porous membranes are required to be manufactured by a simple process as well as to have the membrane performance such as high fractionation performance and hydrophilicity.

The following ones are known as porous membranes.

Patent Literature 1 discloses a porous membrane including a mixture of a polyvinylidene fluoride-based resin with a graft copolymer in which the main chain is an acrylate ester-based polymer and/or a methacrylic acid ester-based polymer and the side chain is an ethylene oxide-based polymer and/or a propylene oxide-based polymer as a main component.

Patent Literature 2 discloses a porous membrane including a random copolymer of methyl methacrylate with methoxypolyethylene glycol methacrylate.

Patent Literature 3 discloses a porous membrane including a polyvinylidene fluoride resin and a copolymer of methyl methacrylate with methacrylic acid.

CITATION LIST

Patent Literature

Patent Literature 1: JP 2007-723 A
Patent Literature 2: JP 2007-182571 A
Patent Literature 3: JP 2008-229612 A

SUMMARY OF THE INVENTION

Problem to be Solved by the Invention

However, although the porous membrane described in Patent Literature 1 exhibits excellent low fouling property as compared to a porous membrane formed of a polyvinylidene fluoride resin, the porous membrane hardly exerts high hydrophilicity since a polymer having ethylene oxide or propylene oxide is used therein.

The porous membrane described in Patent Literature 2 has a high contact angle of the surface to pure water (specifically, more than 70°) and exerts hydrophilicity to be only that of polymethyl methacrylate which is a polymer of methyl methacrylate copolymerized in the porous membrane.

The porous membrane described in Patent Literature 3 includes a methacrylic acid copolymer to be strongly acidic, and the metal member of a water treatment apparatus corrodes when the porous membrane comes into contact with the metal member in some cases. Hence, it is concerned that the materials to be used are limited so that a corrosion-resistant material is used in the metal member.

An object of the invention is to provide a porous membrane which exhibits high hydrophilicity and water permeability and hardly corrodes a metal.

Means for Solving Problem

The invention has the following aspects.

[1] A porous membrane including a membrane-forming polymer (A) and a polymer (B) containing a methyl methacrylate unit and a hydroxyl group-containing (meth)acrylate (b1) unit.

[2] The porous membrane according to [1], in which a flux of pure water to permeate the porous membrane is 10 ($m^3/m^2$/MPa/h) or more and less than 200 ($m^3/m^2$/MPa/h).

[3] The porous membrane according to [1] or [2], in which the contact angle of the bulk of the membrane-forming polymer (A) is 60° or more.

[4] The porous membrane according to any one of [1] to [3], in which the membrane-forming polymer (A) is a fluorine-containing polymer.

[5] The porous membrane according to any one of [1] to [4], in which the polymer (B) is a random copolymer.

[6] The porous membrane according to any one of [1] to [5], in which the hydroxyl group-containing (meth)acrylate (b1) unit includes one or more kinds of monomer units selected from the group consisting of 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, polyethylene glycol (meth)acrylate, and polypropylene glycol (meth)acrylate.

[7] The porous membrane according to any one of [1] to [6], in which a content of the hydroxyl group-containing (meth)acrylate (b1) unit in the polymer (B) is from 20 to 60% by mass.

[8] The porous membrane according to any one of [1] to [7], in which the polymer (B) contains another monomer (b2) unit.

[9] The porous membrane according to [8], in which the other monomer (b2) unit is a (meth)acrylate unit containing nitrogen.

[10] The porous membrane according to [9], in which the (meth)acrylate unit containing nitrogen is either unit of dimethylaminoethyl methacrylate or a quaternary salt of dimethylaminoethyl methacrylate.

[11] The porous membrane according to any one of [8] to [10], in which the methyl methacrylate unit, the hydroxyl group-containing (meth)acrylate (b1) unit, and the other monomer (b2) unit in the polymer (B) are all methacrylate units.

[12] The porous membrane according to any one of [8] to [11], in which the methyl methacrylate unit is from 20 to 60% by mass, the hydroxyl group-containing (meth)acrylate (b1) unit is from 20 to 60% by mass, and the other monomer (b2) unit is from 1 to 60% by mass in the polymer (B).

[13] The porous membrane according to any one of [8] to [12], in which a molecular weight of the other monomer constituting the polymer (B) is 300 or less.

[14] The porous membrane according to any one of [1] to [13], in which a proportion of the polymer (B) with respect to a sum of the membrane-forming polymer (A) and the polymer (B) in the porous membrane is from 0.1 to 40% by mass.

[15] The porous membrane according to any one of [1] to [14], in which a contact angle of an outer surface of the porous membrane to pure water is from 1 to 70°.

[16] The porous membrane according to any one of [1] to [15], in which an average pore diameter of a surface of the porous membrane is 300 nm or less.

[17] The porous membrane according to [16], in which an average pore diameter of a surface of the porous membrane is 150 nm or less.

[18] The porous membrane according to any one of [1] to [17], in which a shape of the porous membrane is a hollow fiber shape.

[19] A water treatment apparatus using the hollow fiber-shaped porous membrane according to [18].

[20] A method of manufacturing a porous membrane, the method including coagulating a membrane-forming stock solution containing a membrane-forming polymer (A), a polymer (B) containing a methyl methacrylate unit and a hydroxyl group-containing (meth)acrylate (b1) unit, and a solvent.

Effect of the Invention

According to the invention, it is possible to provide a porous membrane which exhibits high hydrophilicity and water permeability and hardly corrodes a metal.

BRIEF DESCRIPTION OF DRAWINGS

FIG. 1 is a schematic diagram illustrating an apparatus for manufacturing a porous membrane of the invention.

MODE(S) FOR CARRYING OUT THE INVENTION

Hereinafter, an embodiment of the invention will be described in detail.

Incidentally, in the present specification, the term "(meth)acrylate" is a generic term for an acrylate and a methacrylate, and the term "(meth)acrylic acid" is a generic term for acrylic acid and methacrylic acid.

"Porous Membrane"

The porous membrane of the invention is formed by using a membrane-forming stock solution containing a membrane-forming polymer (A) and a polymer (B) to be described later. In other words, the porous membrane of the invention includes the membrane-forming polymer (A) and the polymer (B).

<Membrane-Forming Polymer (A)>

The membrane-forming polymer (A) is one of the constituents of the porous membrane.

The membrane-forming polymer (A) is for maintaining the structure of the porous membrane, and it is possible to select the composition of the membrane-forming polymer (A) according to the properties required for the porous membrane.

For example, in a case in which the porous membrane is required to exhibit chemical resistance, resistance to oxidative deterioration, and heat resistance, it is preferable to use a fluorine-containing polymer, polyvinyl chloride (PVC), polyethylene, polypropylene, polystyrene, a polystyrene derivative, polyamide, polyurethane, polycarbonate, polysulfone, polyethersulfone, cellulose acetate, and the like as the membrane-forming polymer (A). Among these, it is more preferable that the membrane-forming polymer (A) is hydrophobic from the viewpoint of being difficult for the membrane to dissolve in pure water and of being easy to maintain the structure of the membrane. As the membrane-forming polymer (A), a fluorine-containing polymer is particularly preferable among these from the viewpoint of being able to impart chemical resistance and resistance to oxidative deterioration to the porous membrane.

Incidentally, the hydrophobicity in the invention refers to that the contact angle of the bulk of the membrane-forming polymer (A) to pure water is 60° or more. The contact angle of the bulk refers to a contact angle when the membrane-forming polymer (A) is dissolved in a solvent (S) to be described later, a smooth membrane is formed by dropping the solution and then evaporating the solvent (S), and water droplets are attached onto the surface of the smooth membrane. In the invention, the contact angle of the bulk of the membrane-forming polymer (A) refers to the contact angle measured by the following measurement method using a membrane formed by coating a solution obtained by dissolving the membrane-forming polymer (A) in a solvent (S) at a concentration of from 1 to 25% by mass onto a substrate so as to have a thickness of from 50 to 200 μm and then drying the coated solution.

The state of water droplets in 3 seconds after the water droplets (10 μL) of pure water are dropped onto the outer surface of the porous membrane test piece is photographed and the contact angle of the water droplets on the photograph thus obtained is determined by automatic measurement using an image processing program.

Examples of the fluorine-containing polymer may include polyvinylidene fluoride (PVDF), a PVDF-hexafluoropropylene (HFP) copolymer, an ethylene-chlorotrifluoroethylene copolymer (ECTFE), polyvinyl fluoride, and polytetrafluoroethylene (PTFE). Among these, PVDF is preferable from the viewpoint of being able to impart the resistance to oxidative deterioration and mechanical durability to the porous membrane.

The membrane-forming polymer (A) may be used singly or in combination of two or more kinds thereof.

As the membrane-forming polymer (A), a polymer which is soluble in the solvent (S) to be described later but hardly dissolves in pure water is preferable.

Among the polymers described above, PVDF is preferable from the viewpoint of favorable solubility in the solvent (S), chemical resistance, and heat resistance.

The mass average molecular weight (Mw) of the membrane-forming polymer (A) is preferably from 100,000 to 2,000,000. The mechanical strength of the porous membrane tends to be favorable when Mw of the membrane-forming polymer (A) is 100,000 or more, and the solubility of the membrane-forming polymer (A) in the solvent (S) tends to be favorable when Mw of the membrane-forming polymer (A) is 2,000,000 or less. The lower limit value of Mw of the membrane-forming polymer (A) is more preferably 300,000 or more, and the upper limit value thereof is more preferably 1,500,000 or less.

Incidentally, in the case of using those having Mw described above as the membrane-forming polymer (A), it is possible to obtain the membrane-forming polymer (A) having a predetermined Mw by mixing those having different Mw.

Mw of the membrane-forming polymer (A) is determined by gel permeation chromatography (GPC) using polystyrene as a standard sample.

<Polymer (B)>

The polymer (B) is one of the constituents of the porous membrane.

The polymer (B) is a copolymer containing a methyl methacrylate unit and a hydroxyl group-containing (meth)acrylate (b1) unit, and it is obtained by copolymerizing a monomer composition containing methyl methacrylate and a hydroxyl group-containing (meth)acrylate (b1).

The polymer (B) may contain a unit (another monomer (b2) unit) other than the methyl methacrylate unit and the hydroxyl group-containing (meth)acrylate (b1) unit. In addition, the polymer (B) may contain either or both of polymethyl methacrylate and a homopolymer of the hydroxyl group-containing (meth)acrylate (b1) in addition to the copolymer containing the methyl methacrylate unit and the hydroxyl group-containing (meth)acrylate (b1) unit.

Incidentally, in the case of containing polymethyl methacrylate and a homopolymer of the hydroxyl group-containing (meth)acrylate (b1), the content of polymethyl methacrylate is from 0 to 49 parts by mass, preferably from 0 to 30 parts by mass, and more preferably from 0 to 10 parts by mass with respect to 100 parts by mass of the copolymer containing the methyl methacrylate unit and the hydroxyl group-containing (meth)acrylate (b1) unit, and the content of the homopolymer of the hydroxyl group-containing (meth)acrylate (b1) is from 0 to 49 parts by mass, preferably from 0 to 30 parts by mass, and more preferably from 0 to 10 parts by mass with respect to 100 parts by mass of the copolymer containing the methyl methacrylate unit and the hydroxyl group-containing (meth)acrylate (b1) unit.

(Methyl Methacrylate)

Methyl methacrylate is one of the constituents of the polymer (B). By containing the methyl methacrylate unit in the polymer (B), the compatibility between the membrane-forming polymer (A) and the polymer (B) is enhanced and a porous membrane including the membrane-forming polymer (A) and the polymer (B) can be efficiently obtained.

The content of the methyl methacrylate unit is preferably from 10 to 99% by mass when the sum of the entire constitutional units (monomer units) constituting the polymer (B) is taken as 100% by mass. The compatibility with the membrane-forming polymer (A) tends to be enhanced when the content of the methyl methacrylate unit is 10% by mass or more, and a porous membrane tends to be easily obtained the content of the methyl methacrylate unit is 99% by mass or less. The lower limit value of the content of the methyl methacrylate unit is more preferably 15% by mass or more, still more preferably 18% by mass or more, and particularly preferably 20% by mass or more. Meanwhile, the upper limit value of the content of the methyl methacrylate unit is more preferably 80% by mass or less and still more preferably 60% by mass or less.

(Hydroxyl Group-Containing (Meth)Acrylate (b1))

The hydroxyl group-containing (meth)acrylate (b1) is one of the constituents of the polymer (B). By containing the hydroxyl group-containing (meth)acrylate (b1) unit in the polymer (B), it is possible to obtain a porous membrane exhibiting high hydrophilicity.

Specific examples of the hydroxyl group-containing (meth)acrylate (b1) may include 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, polyethylene glycol (meth)acrylate, and polypropylene glycol (meth)acrylate.

The hydroxyl group-containing (meth)acrylate (b1) may be used singly or in combination of two or more kinds thereof.

The content of the hydroxyl group-containing (meth) acrylate (b1) unit is preferably from 1 to 60% by mass and more preferably from 20 to 60% by mass when the sum of the entire constitutional units (monomer units) constituting the polymer (B) is taken as 100% by mass. The surface of the porous membrane tends to be hydrophilic when the content of the hydroxyl group-containing (meth)acrylate (b1) is 1% by mass or more, and the polymer (B) is less likely to dissolve in water so that the hydrophilicity of the porous membrane to be obtained tends to be easily maintained when the content of the hydroxyl group-containing (meth)acrylate (b1) is 60% by mass or less. The lower limit value of the content of the hydroxyl group-containing (meth) acrylate (hi) is more preferably 10% by mass or more, still more preferably 15% by mass or more, and particularly preferably 20% by mass or more. Meanwhile, the upper limit value of the content of the hydroxyl group-containing (meth)acrylate (131) unit is more preferably 58% by mass or less and still more preferably 55% by mass or less.

(Another Monomer (b2))

The other monomer (b2) is one of the constituents that can be contained in the polymer (B).

The other monomer (b2) is not particularly limited as long as it is copolymerizable with methyl methacrylate and the hydroxyl group-containing (meth)acrylate (b1), but from the viewpoint of the solubility of the polymer (B) in the solvent (S), examples thereof may include ethyl (meth) acrylate, n-propyl (meth)acrylate, isopropyl (meth)acrylate, n-butyl (meth)acrylate, isobutyl (meth)acrylate, t-butyl (meth)acrylate, isoamyl methacrylate, hexyl (meth)acrylate, octyl (meth)acrylate, nonyl (meth)acrylate, decyl (meth) acrylate, undecyl (meth)acrylate, lauryl (meth)acrylate, tridecyl (meth)acrylate, tetradecyl (meth)acrylate, pentadecyl (meth)acrylate, phenyl (meth)acrylate, benzyl (meth)acrylate, glycidyl (meth)acrylate, 2-ethylhexyl (meth)acrylate, PLACCEL FM (trade name, manufactured by DAICEL CORPORATION; caprolactone-added monomer), methoxyethyl methacrylate, ethoxyethyl (meth)acrylate, n-butoxyethyl (meth)acrylate, isobutoxyethyl (meth)acrylate, t-butoxyethyl (meth)acrylate, phenoxyethyl (meth)acrylate, nonylphenoxyethyl (meth)acrylate, 3-methoxybutyl (meth) acrylate, BLEMMER PME-100 (trade name, manufactured by NOF CORPORATION; methoxypolyethylene glycol methacrylate (ethylene glycol chain is 2)), BLEMMER PME-200 (trade name, manufactured by NOF CORPORATION; methoxypolyethylene glycol methacrylate (ethylene glycol chain is 4)), dimethylaminoethyl methacrylate, chloride salt of dimethylaminoethyl methyl methacrylate, methacrylic acid dimethylaminoethyl methyl sulfate, 3-(methacryl amido)propyltrimethyl ammonium chloride, 3-(methacrylamido)propyltrimethylammonium methyl sulfate, and a quaternary salt of dimethylaminoethyl methacrylate.

The other monomer (b2) is preferably a (meth)acrylate unit containing nitrogen.

The other monomer (b2) may be used singly or in combination of two or more kinds thereof.

Incidentally, it is preferable that the polymer (B) does not contain a (meth)acrylic acid unit as the other monomer (b2) unit. When the polymer (B) does not contain a (meth)acrylic acid unit, the metal member hardly corrodes even if the porous membrane to be obtained comes into contact with a metal member when being used in a water treatment apparatus and the like, so that the material to be used in the metal member is hardly limited.

The content of the other monomer (b2) unit is preferably 60% by mass or less when the sum of the entire constitutional units (monomer units) constituting the polymer (B) is taken as 100% by mass. The surface of the porous membrane to be obtained tends to be hydrophilic when the content of the other monomer (b2) is 60% by mass or less. The lower limit value of the content of the other monomer (b2) unit is more preferably 1% by mass or more and still more preferably 5% by mass or more from the viewpoint of the flexibility of the porous membrane to be obtained. Meanwhile, the upper limit value of the content of the other monomer (b2) unit is more preferably 55% by mass or less and still more preferably 50% by mass or less.

In addition, the number average molecular weight (Mn) of the other monomer (b2) is preferably from 30 to 300. The membrane-forming stock solution is less likely to be cloudy when the molecular weight of the other monomer is 300 or less.

(Composition of Polymer (B))

It is preferable that the methyl methacrylate unit, the hydroxyl group-containing (meth)acrylate (b1) unit, and the other monomer (b2) unit in the polymer (B) are all methacrylate units.

It is preferable that the methyl methacrylate unit is from 20 to 60% by mass, the hydroxyl group-containing (meth) acrylate (b1) unit is from 20 to 60% by mass, and the other monomer (b2) unit is from 1 to 60% by mass in the polymer (B).

Incidentally, the contents of the methyl methacrylate unit, the hydroxyl group-containing (meth)acrylate (hi) unit, and the other monomer (b2) unit in the polymer (B) are calculated from the signal intensity in the 1H-NMR spectrum.

In addition, the sum of the contents of the methyl methacrylate unit, the hydroxyl group-containing (meth)acrylate (b1) unit, and the other monomer (b2) unit is 100% by mass in the polymer (B).

(Physical Properties of Polymer (B))

The number average molecular weight (Mn) of the polymer (B) is preferably from 1,000 to 5,000,000. The thermal stability of the polymer (B) and the mechanical strength of the porous membrane to be obtained and the hydrophilicity of the outer surface of the porous membrane tend to be enhanced when Mn of the polymer (B) is within the above range. The lower limit value of Mn of the polymer (B) is more preferably 2,000 or more and still more preferably 5,000 or more. Meanwhile, the upper limit value of Mn of the polymer (B) is more preferably 300,000 or less.

The polymer (B) may be used singly or in combination of two or more kinds of polymers having different composition ratios, molecular weight distributions, or molecular weights.

The polymer (B) is preferably a random copolymer. In the case of using a block copolymer or a graft copolymer, the membrane-forming stock solution is cloudy when preparing the membrane-forming stock solution and the porous membrane to be obtained is ununiform when the chain of the hydroxyl group-containing (meth)acrylate (b1) to be contained in the block or graft chain exceeds 10,000 as Mn.

(Method of Manufacturing Polymer (B))

Examples of a method of manufacturing the polymer (B) may include a solution polymerization method.

The solvent (S) to be used when manufacturing the polymer (B) by the solution polymerization method is not particularly limited as long as the polymer (B) to be obtained is soluble therein, but those that can dissolve the membrane-forming polymer (A) are preferable in the case of using the polymerized liquid (C) after polymerization as the membrane-forming stock solution as it is. Examples of such a solvent (5) may include acetone, N,N-dimethylformamide (DMF), N,N-dimethylacetamide (DMAc), dimethyl sulfoxide (DMSO), N-methylpyrrolidone (NMP), hexamethylphosphoric acid triamide (HMPA), tetramethylurea (TMU), triethyl phosphate (TEP), trimethyl phosphate (TMP), and ethanol. Among these, acetone, DMF, DMAc, DMSO, and NMP are preferable from the viewpoint of being easy to handle and obtaining excellent solubility of the membrane-forming polymer (A) and the polymer (B).

The solvent (S) may be used singly or in combination of two or more kinds thereof.

It is possible to use a chain transfer agent and a radical polymerization initiator when manufacturing the polymer (B).

The chain transfer agent adjusts the molecular weight of the polymer (B), and examples of the chain transfer agent may include mercaptan, hydrogen, α-methylstyrene dimer, and a terpenoid.

The chain transfer agent may be used singly or in combination of two or more kinds thereof.

Examples of the radical polymerization initiator may include an organic peroxide and an azo compound.

Specific examples of the organic peroxide may include 2,4-dichlorobenzoyl peroxide, t-butyl peroxypivalate, o-methylbenzoyl peroxide, bis-3,5,5-trimethylhexanoyl peroxide, octanoyl peroxide, t-butylperoxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butyl hydroperoxide, and di-t-butyl peroxide.

Specific examples of the azo compound may include 2,2'-azobisisobutyronitrile (AIBN), 2,2'-azobis(2,4-dimethylvaleronitrile), and 2,2'-azobis(2,4-dimethyl-4-methoxyvaleronitrile).

As the radical polymerization initiator, benzoyl peroxide, AIBN, 2,2'-azobis(2,4-dimethylvaleronitrile), and 2,2'-azobis(2,4-dimethyl-4-methoxyvaleronitrile) are preferable from the viewpoint of being easily available and having a half-life temperature suitable for the polymerization conditions.

The radical polymerization initiator may be used singly or in combination of two or more kinds thereof.

The amount of the radical polymerization initiator added is preferably from 0.0001 to 10 parts by mass with respect to 100 parts by mass of the sum of methyl methacrylate, the hydroxyl group-containing (meth)acrylate (b1), and the other monomer (b2).

The polymerization temperature when manufacturing the polymer (B) is preferably from −100° C. to 250° C., for example, in consideration of the boiling point of the solvent (5) to be used and the temperature range in which the radical polymerization initiator is used. The lower limit value of the polymerization temperature is more preferably 0° C. or higher, and the upper limit value thereof is more preferably 200° C. or lower.

It is possible to use polymerized liquid (C) after polymerization as the membrane-forming stock solution as it is in the case of manufacturing the polymer (B) by the solution polymerization method.

<Physical Properties and Structure of Porous Membrane>

The porous membrane of the invention includes the membrane-forming polymer (A) and the polymer (B) which have been described above.

The outer surface of the porous membrane is hydrophilized as the porous membrane includes the polymer (B). The porous membrane of the invention can have an outer surface having a contact angle to pure water of 70° or less. The porous membrane of the invention preferably has a contact angle to pure water of from 1 to 70°. The contact angle of the outer surface of the porous membrane is an index representing the hydrophilicity of the outer surface of the porous membrane. The outer surface of the porous membrane exhibits higher hydrophilicity and is more likely to exert higher water permeation performance as contact angle of the outer surface of the porous membrane is smaller. The porous membrane can exhibit more favorable water permeability by setting the contact angle of the outer surface of the porous membrane to pure water to 70° or less.

The upper limit value of the contact angle of the outer surface of the porous membrane to pure water is more preferably 60° or less.

In addition, the lower limit value of the contact angle of the outer surface of the porous membrane to pure water is preferably as low as possible, and it is generally 1° or more. The lower limit value of the contact angle of the outer surface of the porous membrane to pure water varies depending on the kind of the membrane-forming polymer (A) to be used, but it is generally 20° or more in the case of using PVDF as the membrane-forming polymer (A).

The contact angle of the outer surface of the porous membrane to pure water can be adjusted by the kind of the membrane-forming polymer (A) and the composition of the polymer (B). A porous membrane having a contact angle of 70° or less tends to be easily obtained, for example, when the content of the hydroxyl group-containing (meth)acrylate (b1) unit in the polymer (B) is 60% by mass or less.

The flux of pure water to permeate the porous membrane of the invention is preferably 10 $(m^3/m^2/MPa/h)$ or more and less than 200 $(m^3/m^2/MPa/h)$. The porous membrane is preferable as a water treatment membrane application since a large amount of water can be treated within a certain period of time when the flux of pure water to permeate the porous membrane is 10 $(m^3/m^2/MPa/h)$ or more, and the porous membrane can be utilized in a wide range of fields such as tap water and sewage since it is possible to decrease defects in the membrane by setting the flux to less than 200 $(m^3/m^2/MPa/h)$.

In the invention, the flux of pure water to permeate the porous membrane is the value obtained by dividing the average value obtained by measuring the amount of pure water flowing out when a pneumatic pressure of 100 kPa is applied to the porous membrane to allow pure water (25° C.) to flow out through the porous membrane for one minute three times by the surface area of the porous membrane and expressing the value thus obtained in terms of a pressure of 1 Mpa.

The content of the polymer (B) with respect to the sum of the membrane-forming polymer (A) and the polymer (B) to be contained in the porous membrane is preferably from 0.1 to 40% by mass and more preferably from 0.1 to 20% by mass. The surface of the porous membrane tends to be hydrophilized when the content of the polymer (B) with respect to the sum of the membrane-forming polymer (A) and the polymer (B) to be contained in the porous membrane is 0.1% by mass or more. When the content of the polymer (B) is 40% by mass or less, the interior of the membrane is hardly blocked by the polymer (B), water can pass through the membrane, and thus a porous membrane in which the flux of pure water to permeate the porous membrane is 10 $(m^3/m^2/MPa/h)$ or more tends to be easily obtained.

The content of the polymer (B) with respect to the sum of the membrane-forming polymer (A) and the polymer (B) to be contained in the porous membrane is calculated from the signal intensity in the 1H-NMR spectrum.

The average pore diameter of the pores on the surface of the porous membrane is preferably from 1 to 1200 nm from the viewpoint of being able to be utilized in the removal of bacteria and viruses, the purification of proteins or enzymes, or the tap water application. There is a tendency that a high percolation pressure is not required at the time of water treatment when the average pore diameter of the pores is 1 nm or more, and there is a tendency that bacteria and viruses and suspended substances and the like in tap water can be easily removed when the average pore diameter is 1200 nm or less.

In addition, the average pore diameter of the pores on the surface of the porous membrane is more preferably 500 nm or less, still more preferably 300 nm or less, and particularly preferably 150 nm or less from the above viewpoint.

The average pore diameter of the pores on the surface of the porous membrane is the value determined by observing the outer surface portion of the porous membrane by using a scanning electron microscope, randomly selecting 30 pores, measuring the longest diameter of each pore, and averaging the longest diameters of 30 pores.

Examples of the form of the porous membrane may include a flat membrane and a hollow fiber membrane.

In a case in which the porous membrane is a flat membrane, the thickness of the flat membrane is preferably from 10 to 1,000 μm. There is a tendency that high stretchability is exhibited and the durability is favorable when the thickness of the flat membrane is 10 μm or more, and the membrane tends to be manufactured at low cost when the thickness is 1,000 μm or less. The lower limit value of the flat membrane is more preferably 20 μm or more and still more preferably 30 μm or more. Meanwhile, the upper limit value of the thickness of the flat membrane is more preferably 900 μm or less and still more preferably 800 μm or less.

In a case in which the porous membrane is a flat membrane, examples of the internal structure of the membrane may include a graded structure in which the size of the pores decreases in a specific direction on the cross section of the membrane and a structure having homogeneous pores.

In a case in which the porous membrane is a flat membrane, it is possible to have a macro void or a spherocrystal structure in the membrane.

In a case in which the porous membrane is a hollow fiber membrane, the outer diameter of the hollow fiber membrane is preferably from 20 to 2,000 μm. The thread breakage tends to hardly occur at the time of membrane formation when the outer diameter of the hollow fiber membrane is 20 μm or more, and there is a tendency that it is easy to maintain the hollow shape and particularly the membrane is hardly flatten even if an external pressure is applied thereto when the outer diameter is 2,000 μm or less. The lower limit value of the outer diameter of the hollow fiber membrane is more preferably 30 μm or more and still more preferably 40 μm or more. Meanwhile, the upper limit value of the outer diameter of the hollow fiber membrane is more preferably 1,800 μm or less and still more preferably 1,500 μm or less.

In a case in which the porous membrane is a hollow fiber membrane, the wall thickness of the hollow fiber membrane is preferably from 5 to 500 μm. The thread breakage tends to hardly occur at the time of membrane formation when the wall thickness of the hollow fiber membrane is 5 μm or more, and the hollow shape tends to be easily maintained when the wall thickness is 500 μm or less. The lower limit value of the wall thickness of the hollow fiber membrane is preferably 10 μm or more and still more preferably 15 μm or more. Meanwhile, the upper limit value of the wall thickness of the hollow fiber membrane is more preferably 480 μm or less and still more preferably 450 μm or less.

<Method of Manufacturing Porous Membrane>

An example of a method of manufacturing the porous membrane of the invention will be described below.

First, a membrane-forming stock solution (solution for preparing a porous membrane) is prepared by dissolving the membrane-forming polymer (A) and the polymer (B) in the solvent (S) (preparation step). Subsequently, the membrane-forming stock solution thus obtained is coagulated by being immersed in a coagulating liquid, thereby obtaining a porous membrane precursor (coagulation step). Subsequently, a part of the solvent (S) and polymer (B) which remain in the porous membrane precursor are removed by washing (washing step), and the washed porous membrane precursor is dried (drying step), thereby obtaining a porous membrane.

(Membrane-Forming Stock Solution)

The membrane-forming stock solution is obtained by dissolving the membrane-forming polymer (A) and the polymer (B) in the solvent (S). In addition, the membrane-forming polymer (A) may be directly added to the polymerized liquid (C) after polymerization and dissolved therein in the case of manufacturing the polymer (B) by the solution polymerization method using the solvent (S). At this time, the polymerized liquid (C) may be diluted by further adding the solvent (S) so as to have a desired concentration.

Incidentally, the membrane-forming stock solution is uniform even when a part of the membrane-forming polymer (A) or polymer (B) is not dissolved but dispersed in the solvent (S), and the membrane-forming stock solution may be in a dispersed state as long as the uniformity can be maintained.

In addition, when preparing the membrane-forming stock solution, the membrane-forming polymer (A) and the polymer (B) may be dissolved while heating the solvent (S) as long as the temperature is equal to or lower than the boiling point of the solvent (S). Furthermore, the polymerized liquid (C) may be cooled if necessary.

The content of the membrane-forming polymer (A) in 100% by mass of the membrane-forming stock solution is preferably from 5 to 40% by mass. There is a tendency that it is possible to easily form the membrane-forming stock solution into a porous membrane when the content of the membrane-forming polymer (A) is 5% by mass or more, and there is a tendency that it is possible to easily dissolve the membrane-forming polymer (A) in the solvent (S) when the content of the membrane-forming polymer (A) is 40% by mass or less. The lower limit value of the content of the membrane-forming polymer (A) is more preferably 8% by mass or more and still more preferably 10% by mass or more. Meanwhile, the upper limit value of the content of the membrane-forming polymer (A) is more preferably 30% by mass or less, still more preferably 25% by mass or less, and particularly preferably 20% by mass or less.

The content of the polymer (B) in 100% by mass of the membrane-forming stock solution is preferably from 1 to 30% by mass. There is a tendency that it is possible to easily form the membrane-forming stock solution into a porous membrane when the content of the polymer (B) is 1% by mass or more, and the solubility of the membrane forming polymer (A) in the solvent (S) tends to be enhanced when the content of the polymer (B) is 30% by mass or less. The lower limit value of the content of the polymer (B) is more preferably 2% by mass or more and still more preferably 5% by mass or more. Meanwhile, the upper limit value of the content of the polymer (B) is more preferably 20% by mass or less and still more preferably 15% by mass or less.

Incidentally, it is preferable that the membrane-forming stock solution does not contain a homopolymer or copolymer of (meth)acrylic acid. When the membrane-forming stock solution does not contain a homopolymer or copolymer of (meth)acrylic acid, the metal member hardly corrodes even if the porous membrane to be obtained comes into contact with a metal member when being used in a water treatment apparatus and the like, so that the material to be used in the metal member is hardly limited.

(Coagulating Liquid)

As the coagulating liquid to be used when obtaining the porous membrane precursor, an aqueous solution of a solvent (S) having a concentration of from 0 to 50% by mass is preferable from the viewpoint of controlling the pore diameter of the membrane.

The solvent (S) to be contained in the coagulating liquid and the solvent (S) to be contained in the membrane-forming stock solution may be of the same kind or of different kinds, but these are preferably of the same kind.

The temperature of the coagulating liquid is preferably from 10 to 90° C. The water permeation performance of the porous membrane tends to be improved when the temperature of the coagulating liquid is 10° C. or higher, and the mechanical strength of the porous membrane tends to be favorably maintained when the temperature of the coagulating liquid is 90° C. or lower.

(Washing Step)

It is preferable to remove a part of the solvent (S) and polymer (B) which remain in the porous membrane precursor by washing by immersing the porous membrane precursor obtained in the coagulation step in either or both of hot water and an aqueous solution of solvent (S) which are at from 40 to 100° C.

A high effect of washing the porous membrane precursor tends to be obtained when the temperatures of the hot water or the aqueous solution of solvent (S) are 40° C. or, and the porous membrane precursor tends to be hardly fused when the temperatures thereof are 100° C. or lower.

(Drying Step)

It is preferable to dry the porous membrane precursor after the washing step at from 60 to 120° C. for 1 minute to 24 hours.

When the drying temperature is 60° C. or higher, it is possible to shorten the time for drying treatment and to suppress the production cost and it is thus preferable from the viewpoint of industrial production. Meanwhile, when the drying temperature is 120° C. or lower, it is possible to suppress excessive shrinkage of the porous membrane precursor in the drying step and thus micro cracks tend to be hardly generated on the outer surface of the porous membrane.

<Effect>

The porous membrane of the invention described above exhibits high hydrophilicity since it includes the membrane-forming polymer (A) and the polymer (B) which have been described above. The polymer (B) is obtained by a usual radical polymerization method, and a porous membrane can be thus easily manufactured.

In addition, in the invention, it is not required to use (meth)acrylic acid as a raw material for the porous membrane. Hence, the porous membrane of the invention hardly corrodes a metal, and thus the metal member hardly corrodes even if the porous membrane of the invention comes into contact with a metal member when being used in a water treatment apparatus and the like, so that the material to be used in the metal member is hardly limited.

<Application>

The porous membrane of the invention is suitable as a porous membrane to be used in the water treatment fields such as drinking water production, water purification treatment, and wastewater treatment.

In addition, the porous membrane of the invention is also suitable as a porous membrane to be used in, for example, a support of an electrolytic solution in addition to the above. In particular, it is suitable as a support swollen with a lithium ion electrolytic solution of a lithium ion battery.

EXAMPLES

Hereinafter, the invention will be described in more detail with reference to Examples, but the invention is not limited thereto.

Incidentally, the terms "parts" and "%" in the following description respectively denote "parts by mass" and "% by mass".

The composition and structure of the polymer were analyzed by the following method. Mw, Mn, and Mw/Mn of the polymer were measured by the following method.

"Measurement"

(1) Analysis of Composition and Structure of Polymer (B) or Polymer (B')

The composition and structure of the polymer (B) or the polymer (B') were analyzed by 1H-NMR ("JNM-EX 270" (product name) manufactured by JEOL Ltd.). Incidentally, N,N-dimethylacetamide-d9 to which TMS (tetramethylsilane) was added was used as the deuterated solvent.

In addition, the composition of the hydroxyl group-containing (meth)acrylate (b1) and another monomer (b2) in the polymer (B) or the polymer (B') was calculated with reference to the spectrum database (SDBS) of organic compounds provided by National Institute of Advanced Industrial Science and Technology.

(2) Measurement of Mw of Membrane-Forming Polymer (A)

Mw of the membrane-forming polymer (A) was determined by using GPC ("HLC-8020" (product name) manufactured by Tosoh Corporation) under the following conditions.

Column: TSK GUARD COLUMN a (7.8 mm×40 mm) connected with three TSK-GEL α-M (7.8×300 mm) in series Eluent: N,N-dimethylformamide (DMF) solution (LiBr concentration: 20 mM) of lithium bromide (LiBr)

Measured temperature: 40° C.

Flow velocity: 0.1 mL/min

Incidentally, the Mw of the membrane-forming polymer (A) was determined by using the calibration curve created by using polystyrene standards (Mp (peak top molecular weight)=eight kinds of 76,969,900, 2,110,000, 1,260,000, 775,000, 355,000, 186,000, 19,500, and 1,050) manufactured by Tosoh Corporation and a styrene monomer (M (molecular weight)=104) manufactured by NS Styrene Monomer Co., Ltd.

(3) Measurement of Mn and Mw/Mn of Polymer (B) or Polymer (B')

Mn and Mw/Mn of the polymer (B) or the polymer (B') were determined by using GPC ("HLC-8220" (product name) manufactured by Tosoh Corporation) under the following conditions.

Column: TSK GUARD COLUMN SUPER H-L (4.6×35 mm) connected with two TSK-GEL SUPER IIZM-II (4.6×150 mm) in series Eluent: DMF solution (concentration of LiCl: 0.01 M) of lithium chloride (LiCl)

Measured temperature: 40° C.

Flow velocity: 0.6 mL/min

Incidentally, Mn and Mw/Mn of the polymer (B) or the polymer (B') were determined by using the calibration curve created by using polystyrene standards (Mp (peak top molecular weight)=12 kinds of 6,200,000, 2,800,000, 1,110,000, 707,000, 354,000, 189,000, 98,900, 37,200, 9,830, 5,870, 870, and 500) manufactured by Tosoh Corporation.

(4) Measurement of Contact Angle

The contact angle of the porous membrane to pure water was measured by the following method.

A porous membrane test piece was placed on the sample table of a contact angle measuring apparatus ("DSA-10" (product name) manufactured by Kruss). Subsequently, the state of water droplets in 3 seconds after dropping water droplets (10 μL) of pure water (for LC/MS, manufactured by Wako Pure Chemical Industries, Ltd.) onto the outer surface of the porous membrane test piece was photographed by using the CCD camera attached to the apparatus. The contact angle of the water droplets on the photograph thus obtained was determined by automatic measurement using an image processing program incorporated in the contact angle measuring apparatus.

(5) Measurement of Average Pore Diameter

The average pore diameter of the pores on the surface of the porous membrane was measured by the following method.

A range of 500 μm×500 μm at an arbitrary place on the outer surface of the porous membrane test piece was selected at least at five places, the longest diameters of 30 pores randomly selected among the pores present in the selected ranges at the five places were measured by using a scanning electron microscope ("JSM-7400" (product name) manufactured by JEOL Ltd.), and the average value of the measured values was taken as the average pore diameter.

(6) Content of Polymer (B) or Polymer (B') with Respect to Sum of Membrane-Forming Polymer (A) and Polymer (B) or Polymer (B') in Porous Membrane The obtained porous membrane was dissolved in N,N-dimethylsulfoxide-d6 to which TMS (tetramethylsilane) was added, and the composition and structure of the membrane-forming polymer (A) and the polymer (B) or the polymer (B') were analyzed by 1H-NMR ("JNM-EX 270" (product name) manufactured by JEOL Ltd.).

The composition of the membrane-forming polymer (A) and the polymer (B) or the polymer (B') was calculated with reference to the spectrum database (SDBS) of organic compounds provided by National Institute of Advanced Industrial Science and Technology.

(7) Measurement of Pure Water Flux

The hollow porous membrane of each of Examples was cut to have a length of 4 cm, and an opening of one end face was sealed with a polyurethane resin thereby preparing a sample. Pure water (25° C.) was put in a container, one end face (open end face) of the sample was connected to the container via a tube, a pneumatic pressure of 100 kPa was applied to the container to allow pure water to flow out through the pores of the sample, and the amount of pure water flowing out for 1 minute was measured. This was measured three times, and the average value thereof was determined. This numerical value was divided by the surface area of the sample, the value thus obtained was expressed in terms of a pressure of 1 Mpa, and the value finally obtained was taken as the water permeation performance of the hollow porous membrane.

"Synthesis of Polymer"

<Synthesis of Polymer (B-1)>

In a flask equipped with a cooling tube, a monomer composition containing 50 parts of methyl methacrylate, 50 parts of 2-hydroxyethyl methacrylate ("ACRYESTER HO" (trade name) manufactured by Mitsubishi Rayon Co., Ltd.) as the hydroxyl group-containing (meth)acrylate (b1), and 150 parts of N,N-dimethylacetamide (manufactured by Wako Pure Chemical Industries, Ltd., Special Grade Reagent) as a solvent (S) was put, and the interior of the flask was purged with nitrogen by nitrogen bubbling. Subsequently, 0.2 part of 2,2'-azobisisobutyronitrile (manufactured by Wako Pure Chemical Industries, Ltd., Wako Special Grade) was added to the monomer composition in a state in which the monomer composition was heated and the internal temperature thereof was maintained at 70° C., and the mixture was then retained for 4 hours. Subsequently, the temperature was raised to 80° C., and 0.2 part of the same amount as that previously added of 2,2'-azobisisobutyronitrile was additionally added to the monomer composition, the mixture was then retained for 60 minutes to complete the polymerization, the resultant mixture was cooled to room temperature, thereby obtaining a polymerized liquid (C-1) containing a polymer (B-1) at 40%.

Mn and Mw/Mn of the polymer (B-1) contained in the polymerized liquid (C-1) were measured, and as a result, Mn was 129,000 and Mw/Mn was 3.2. The results are presented in Table 1.

In addition, the polymer (B-1) was taken out from the polymerized liquid (C-1) and dried, the composition and structure of the polymer (B-1) were analyzed, and as a result, the proportion of methyl methacrylate was 50% and the proportion of 2-hydroxyethyl methacrylate was 50%. In other words, the polymer (B-1) is a copolymer composed of 50% of a methyl methacrylate unit and 50% of a 2-hydroxyethyl methacrylate unit. The results are presented in Table 1.

<Synthesis of Polymers (B-2) to (B-6)>

A polymerized liquid (C-2) containing a polymer (B-2) at 40%, a polymerized liquid (C-3) containing a polymer (B-3) at 40%, a polymerized liquid (C-4) containing a polymer (B-4) at 40%, a polymerized liquid (C-5) containing a polymer (B-5) at 33%, and a polymerized liquid (C-6) containing a polymer (B-6) at 33% were respectively obtained in the same manner as the polymer (B-1) except that the composition of the monomer composition was changed as presented in Table 1.

Mn and Mw/Mn of the polymers (B-2) to (B-6) were measured, and the compositions and structures thereof were analyzed. The results are presented in Table 1.

<Synthesis of Polymer (B'-1)>

In a flask equipped with a cooling tube, a monomer composition containing 50 parts of methyl methacrylate, 50 parts of polyethylene glycol methacrylate monomethyl ether ("BLEMMER PME 400" (trade name) manufactured by NOF CORPORATION) as another monomer (b2), and 150 parts of N,N-dimethylacetamide (manufactured by Wako Pure Chemical Industries, Ltd., Special Grade Reagent) as a solvent (5) was put, and the interior of the flask was purged with nitrogen by nitrogen bubbling. Subsequently, 0.2 part of 2,2'-azobisisobutyronitrile (manufactured by Wako Pure Chemical Industries, Ltd., Wako Special Grade) was added to the monomer composition in a state in which the monomer composition was heated and the internal temperature thereof was maintained at 70° C., and the mixture was then retained for 4 hours. Subsequently, the temperature was raised to 80° C., and 0.2 part of the same amount as that previously added of 2,2'-azobisisobutyronitrile was additionally added to the monomer composition, the mixture was then retained for 60 minutes to complete the polymerization, the resultant mixture was cooled to room temperature, thereby obtaining a polymerized liquid (C'-1) containing a polymer (B'-1) at 40%.

Mn and Mw/Mn of the polymer (B'-1) contained in the polymerized liquid (C'-1) were measured, and as a result, Mn was 70,000 and Mw/Mn was 1.4. The results are presented in Table 1.

In addition, the polymer (B'-1) was taken out from the polymerized liquid (C'-1) and dried, the composition and structure of the polymer (B'-1) were analyzed, and as a result, the proportion of methyl methacrylate was 50% and the proportion of polyethylene glycol methacrylate monomethyl ether was 50%. In other words, the polymer (B'-1) is a copolymer composed of 50% of a methyl methacrylate unit and 50% of a polyethylene glycol methacrylate monomethyl ether unit. The results are presented in Table 1.

<Synthesis of Polymers (B'-2) to (B'-5)>

A polymerized liquid (C'-2) containing a polymer (B'-2) at 40%, a polymerized liquid (C'-3) containing a polymer (B'-3) at 40%, a polymerized liquid (C'-4) containing a polymer (B'-4) at 40%, and a polymerized liquid (C'-5) containing a polymer (B'-5) at 40% were respectively obtained in the same manner as the polymer (B'-1) except that the composition of the monomer composition was changed as presented in Table 1.

Mn and Mw/Mn of the polymers (B'-2) to (B'-5) were measured and compositions and structures thereof were analyzed. The results are presented in Table 1.

TABLE 1

|  |  |  |  | Synthesis Example 1 | Synthesis Example 2 | Synthesis Example 3 | Synthesis Example 4 | Synthesis Example 5 | Synthesis Example 6 |
|---|---|---|---|---|---|---|---|---|---|
|  | Polymerized liquid (C) |  |  | C-1 | C-2 | C-3 | C-4 | C-5 | C-6 |
| Monomer | Methyl methacrylate |  |  | 50 | 50 | 40 | 35 | 30 | 25 |
| composition | Hydroxyl group-containing | HEA |  | — | — | — | — | — | — |
| (parts) | (meth)acrylate (b1) | HEMA |  | 50 | 50 | 40 | 35 | 30 | 25 |
|  | Another monomer (b2) | DMAEMA |  | — | — | 20 | 30 | 40 | 50 |
|  |  | PEGMA$_{400}$ |  | — | — | — | — | — | — |
|  | Polymerization initiator | AIBN |  | 0.4 | 0.2 | 0.2 | 0.2 | 0.2 | 0.2 |
|  | Solvent (S) | DMA$_c$ |  | 150 | 150 | 150 | 150 | 200 | 200 |
| Evaluation | Polymer (B) or polymer (B') |  |  | B-1 | B-2 | B-3 | B-4 | B-5 | B-6 |
| results | Composition | Methyl methacrylate |  | 50 | 50 | 40 | 35 | 30 | 25 |
|  | of polymer | Hydroxyl | HEA | — | — | — | — | — | — |
|  | (B) or | group- | HEMA | 50 | 50 | 40 | 35 | 30 | 25 |
|  | polymer (B') | containing |  |  |  |  |  |  |  |
|  | (%) | (meth)acrylate |  |  |  |  |  |  |  |
|  |  | (b1) |  |  |  |  |  |  |  |

TABLE 1-continued

|  |  |  |  |  |  |  |  |
|---|---|---|---|---|---|---|---|
| | Another monomer (b2) | DMAEMA | — | — | 20 | 30 | 40 | 50 |
| | | PEGMA$_{400}$ | — | — | — | — | — | — |
| Molecular weight and molecular weight distribution | | Mn | 129,000 | 200,000 | 170,000 | 120,000 | 84,000 | 74,000 |
| | | Mw/Mn | 3.2 | 3.8 | 3.5 | 3.9 | 4.4 | 4.6 |

| | | | Synthesis Example 7 | Synthesis Example 8 | Synthesis Example 9 | Synthesis Example 10 | Synthesis Example 11 |
|---|---|---|---|---|---|---|---|
| | Polymerized liquid (C) | | C'-1 | C'-2 | C'-3 | C'-4 | C'-5 |
| Monomer composition (parts) | Methyl methacrylate | | 50 | 100 | — | 10 | 50 |
| | Hydroxyl group-containing (meth)acrylate (b1) | HEA | — | — | 100 | — | — |
| | | HEMA | — | — | — | — | — |
| | Another monomer (b2) | DMAEMA | — | — | — | — | 50 |
| | | PEGMA$_{400}$ | 50 | — | — | 90 | — |
| | Polymerization initiator | AIBN | 0.4 | 0.4 | 0.4 | 0.4 | 0.2 |
| | Solvent (S) | DMA$_c$ | 150 | 150 | 150 | 150 | 150 |
| Evaluation results | Polymer (B) or polymer (B') | | B'-1 | B'-2 | B'-3 | B'-4 | B'-5 |
| | Composition of polymer (B) or polymer (B') (%) | Methyl methacrylate | 50 | 100 | — | 10 | 50 |
| | | Hydroxyl group-containing (meth)acrylate (b1) HEA | — | — | 100 | — | — |
| | | HEMA | — | — | — | — | — |
| | | Another monomer (b2) DMAEMA | — | — | — | — | — |
| | | PEGMA$_{400}$ | 50 | — | — | 90 | 50 |
| Molecular weight and molecular weight distribution | | Mn | 70,000 | 110,000 | 31,400 | 130,000 | 120,000 |
| | | Mw/Mn | 1.4 | 2.1 | 10.5 | 6.2 | 4.1 |

The abbreviations in Table 1 denote the following compounds.
HEA: 2-hydroxyethyl acrylate (manufactured by Wako Pure Chemical Industries, Ltd., Wako First Class)
HEAM: 2-hydroxyethyl methacrylate ("ACRYESTER HO" (trade name) manufactured by Mitsubishi Rayon Co., Ltd.)
DMAEMA: dimethylaminoethyl methacrylate ("ACRYESTER DM" (trade name) manufactured by Mitsubishi Rayon Co., Ltd.)
PEGMA 400: polyethylene glycol methacrylate monomethyl ether ("BLEMMER PME 400" (trade name) manufactured by NOF CORPORATION))
AIBN: 2,2'-azobisisobutyronitrile (manufactured by Wako Pure Chemical Industries, Ltd., Wako Special Grade)
DMAc: N,N-dimethylacetamide (manufactured by Wako Pure Chemical Industries, Special Grade Reagent)

"Fabrication of Membrane"

Mixed were 5.1 parts of polyvinylidene fluoride ("Kynar 761A" (trade name) manufactured by Arkema, Mw=550,000) as a membrane-forming polymer (A) and 17.40 parts of N,N-dimethylacetamide (manufactured by Wako Pure Chemical Industries, Ltd., Wako Special Grade), and the mixture was heated at 80° C. to dissolve polyvinylidene fluoride in N,N-dimethylacetamide. This solution was coated on a glass substrate so as to have a thickness of 100 μm by using a bar coater and then dried, thereby obtaining a membrane. The contact angle of the membrane to pure water was 90°.

"Preparation of Flat Membrane-Shaped Porous Membrane"

Example 1

In a glass container, 5.1 parts of polyvinylidene fluoride ("Kynar 761A" (trade name) manufactured by Arkcma, Mw=550,000) as the membrane-forming polymer (A), 9.00 parts (3.60 parts in terms of solids) of the polymerized liquid (C-1) containing the polymer (B-1) as the polymer (B), and 17.40 parts of N,N-dimethylacetamide (manufactured by Wako Pure Chemical Industries, Ltd., Wako Special Grade) as a solvent (S) were blended, and the mixture was stirred at 50° C. for 10 hours by using a stirrer, thereby preparing a membrane-forming stock solution. Incidentally, the content of polyvinylidene fluoride and the content of the polymer (B-1) are respectively 16.2% and 11.4% in 100% of the membrane-forming stock solution.

The membrane-forming stock solution thus obtained was left to still stand at room temperature for one day and then coated on a glass substrate so as to have a thickness of 200 μm by using a bar coater, thereby obtaining a coating membrane laminate.

The coating membrane laminate thus obtained was immersed in a coagulating liquid containing 70 parts of deionized water and 30 parts of N,N-dimethylacetamide as a coagulating liquid at room temperature. After the coating membrane laminate was left to stand in the coagulation liquid for 5 minutes, the coagulated product (porous membrane precursor) of the coating membrane was peeled off from the glass substrate, the coagulated product of the coating membrane was washed with hot water at 80° C. for 5 minutes to remove N,N-dimethylacetamide, thereby fabricating a flat membrane-shaped porous membrane. The flat membrane-shaped porous membrane thus obtained was dried at room temperature for 20 hours, thereby obtaining a porous membrane test piece having a thickness of 100 μm.

The contact angle and average pore diameter of the porous membrane test piece thus obtained were measured. The results are presented in Table 2.

Examples 2 to 6

Porous membrane test pieces were obtained in the same manner as in Example 1 except that those presented in Table 2 were used as the membrane forming stock solution and the coagulating liquid.

The contact angle and average pore diameter of the porous membrane test pieces thus obtained were measured. The results are presented in Table 2.

Comparative Examples 1 to 5

Porous membrane test pieces were obtained in the same manner as in Example 1 except that those presented in Table 2 were used as the membrane forming stock solution and the coagulating liquid.

The contact angle and average pore diameter of the porous membrane test pieces thus obtained were measured. The results are presented in Table 2.

TABLE 2

|  |  |  | Example 1 | Example 2 | Example 3 | Example 4 | Example 5 | Example 6 | Comparative Example 1 |
|---|---|---|---|---|---|---|---|---|---|
| Membrane-forming stock solution | Polymer (A) | Kind | Kynar 761A | Kynar 761A | Kynar 761A | Kynar 761A | Kynar 761A | Kynar 761A | Kynar 761A |
|  |  | Content (parts) | 5.1 | 5.1 | 5.1 | 5.1 | 5.1 | 5.1 | 5.1 |
|  | Polymerized liquid | Kind | C-1 | C-2 | C-3 | C-4 | C-5 | C-6 | C'-1 |
|  |  | Polymer contained (B) | B-1 | B-2 | B-3 | B-4 | B-5 | B-6 | B'-1 |
|  |  | Content (parts) | 9.00 | 9.00 | 9.00 | 9.00 | 10.91 | 10.91 | 9.00 |
|  | Solvent (S) | Kind | $DMA_C$ | $DMA_C$ | $DMA_C$ | $DMA_C$ | $DMA_C$ | $DMA_C$ | $DMA_C$ |
|  |  | Content (parts) | 17.40 | 17.40 | 17.40 | 17.40 | 15.49 | 15.49 | 17.40 |
| Coagulating liquid | Solvent (S) | Kind | $DMA_C$ | $DMA_C$ | $DMA_C$ | $DMA_C$ | $DMA_C$ | $DMA_C$ | $DMA_C$ |
|  |  | Content (parts) | 30 | 40 | 40 | 40 | 40 | 40 | 30 |
|  | Deionized water | Content (parts) | 70 | 60 | 60 | 60 | 60 | 60 | 70 |
| Evaluation results for porous membrane | | Contact angle (°) | 61 | 56 | 69 | 62 | 68 | 67 | 82 |
|  |  | Pore diameter (nm) | 300 | 30 | 70 | 85 | 80 | 83 | 590 |

|  |  |  | Comparative Example 2 | Comparative Example 3 | Comparative Example 4 | Comparative Example 5 |
|---|---|---|---|---|---|---|
| Membrane-forming stock solution | Polymer (A) | Kind | Kynar 761A | Kynar 761A | Kynar 761A | Kynar 761A |
|  |  | Content (parts) | 5.1 | 5.1 | 5.1 | 5.1 |
|  | Polymerized liquid | Kind | C'-2 | C'-3 | C'-4 | C'-5 |
|  |  | Polymer contained (B) | B'-2 | B'-3 | B'-4 | B'-5 |
|  |  | Content (parts) | 9.00 | 9.00 | 9.00 | 9.00 |
|  | Solvent (S) | Kind | $DMA_C$ | $DMA_C$ | $DMA_C$ | $DMA_C$ |
|  |  | Content (parts) | 17.40 | 17.40 | 17.40 | 17.40 |
| Coagulating liquid | Solvent (S) | Kind | $DMA_C$ | $DMA_C$ | $DMA_C$ | $DMA_C$ |
|  |  | Content (parts) | 30 | 30 | 40 | 40 |
|  | Deionized water | Content (parts) | 70 | 70 | 60 | 60 |
| Evaluation results for porous membrane | | Contact angle (°) | 80 | Unmeasurable | 76 | 78 |
|  |  | Pore diameter (nm) | No pores | Unmeasurable | No pores | 80 |

The abbreviations in Table 2 denote the following compounds.
Kynar 761A: polyvinylidene fluoride ("Kynar 761 A" (trade name) manufactured by Arkema, Mw = 550,000)
DMAc: N,N-dimethylacetamide (manufactured by Wako Pure Chemical Industries, Special Grade Reagent)

As is clear from the results in Table 2, the porous membrane test piece obtained in each of Examples had a contact angle of 70° or lower and thus exhibited high hydrophilicity. In addition, the porous membrane test piece obtained in each of Examples does not contain (meth)acrylic acid and thus hardly corrodes a metal.

Meanwhile, in the case of Comparative Example 1, since a polymer (B'-1) which did not contain a hydroxyl group-containing (meth)acrylate (b1) unit was used, the contact angle of the porous membrane test piece thus obtained to pure water was as high as 82° and the hydrophilicity thereof was lower than that of the porous membrane test piece obtained in each of Examples.

In the case of Comparative Example 2, since a polymer (B'-2) which did not contain a hydroxyl group-containing (meth)acrylate (b1) unit was used, the contact angle of the porous membrane test piece thus obtained to pure water was as high as 80° and the hydrophilicity thereof was lower than that of the porous membrane test piece obtained in each of Examples. In addition, the surface of the membrane was observed by using a scanning electron microscope, but it was impossible to observe pores (no pores).

In the case of Comparative Example 3, since the polymer (B'-3) which did not contain a methyl methacrylate unit was used, the polymer (B'-3) easily flowed out into the coagulating liquid, the membrane dissolved, and it was thus impossible to obtain a porous membrane test piece. Hence, it was impossible to measure the contact angle and average pore diameter.

In the case of Comparative Example 4, since a polymer (B'-4) which did not contain a hydroxyl group-containing (meth)acrylate (b1) unit was used, the contact angle of the porous membrane test piece thus obtained to pure water was as high as 76° and the hydrophilicity thereof was lower than that of the porous membrane test piece obtained in each of Examples. In addition, the surface of the membrane was observed by using a scanning electron microscope, but it was impossible to observe pores (no pores).

In the case of Comparative Example 5, since the polymer (B'-5) which did not contain a hydroxyl group-containing (meth)acrylate (b1) unit was used, the contact angle of the porous membrane test piece thus obtained to pure water was as high as 78° and the hydrophilicity thereof was lower than that of the porous membrane test piece obtained in each of Examples.

"Preparation of Hollow Fiber Membrane-Shaped Porous Membrane"

Example 7

A multifilament of polyester fiber (made of PET, fineness: 417 dtex) was circular-knitted in a cylindrical shape by using a support manufacturing apparatus, and the circular-knitted product was subjected to a heat treatment at 210° C., thereby obtaining a support. The outer diameter of the support thus obtained was 2.43 mm.

A hollow fiber membrane-shaped porous membrane was fabricated by using a manufacturing apparatus 1 illustrated in FIG. 1. The stock solution used in Example 1 was sent from a stock solution feeder 2 of the manufacturing apparatus 1 and the stock solution was coated on a support 4 in a coating unit 3. Subsequently, the support 4 coated with the membrane-forming stock solution was imbued with the coagulating liquid in a coagulating bath 5 at 80° C. so that the membrane-forming stock solution was coagulated, thereby obtaining a hollow fiber membrane precursor 6 having a porous layer.

As the coagulating liquid, an aqueous solution of DMAc at 40% by mass was used. The step of immersing the hollow fiber membrane precursor in hot water at 60° C. was repeated three times, and the hollow fiber membrane precursor was finally dried in a drying oven heated to 115° C. for 3 minutes to evaporate the moisture, thereby obtaining a hollow fiber membrane.

The flux of pure water to permeate the hollow fiber membrane thus obtained was 13 ($m^3/m^2/MPa/h$), and the content of the polymer (B-1) with respect to the sum of the membrane-forming polymer (A) and the polymer (B-1) to be contained in the porous membrane was 40% by mass.

Examples 8 to 12

Hollow fiber membranes were obtained in the same manner as in Example 7 except that those presented in Table 3 were used instead of the membrane-forming stock solution used in Example 7. The flux of pure water to permeate the hollow fiber membranes thus obtained and the content of the polymer (B) with respect to the sum of the membrane-forming polymer (A) and the polymer (B) to be contained in the porous membranes are presented in Table 3.

Example 13

The porous membrane obtained in Example 7 was immersed in a solution prepared by mixing 20 parts of pure water with 80 parts of ethanol (manufactured by Wako Pure Chemical Industries, Ltd., Wako First Grade) and left to stand for 1 hour while maintaining the internal temperature at 60° C. The hollow fiber membrane thus obtained was immersed in a large amount of water for 1 hour to remove the washing liquid and left to stand in a drying oven heated to 60° C. for 3 hours to evaporate the moisture. The flux of pure water to permeate the hollow fiber membrane thus obtained was 52 ($m^3/m^2/MPa/h$), and the content of the polymer (B-1) with respect to the sum of the membrane-forming polymer (A) and the polymer (B-1) to be contained in the porous membrane was 9% by mass.

Examples 14 to 20

Hollow fiber membranes were obtained in the same manner as in Example 13 except that those presented in Table 3 were used instead of the hollow fiber membrane and the washing liquid used in Example 13. The flux of pure water to permeate the hollow fiber membranes thus obtained and the content of the polymer (B) with respect to the sum of the membrane-forming polymer (A) and the polymer (B) to be contained in the porous membranes are presented in Table 3.

TABLE 3

| | | | Example 7 | Example 8 | Example 9 | Example 10 | Example 11 | Example 12 | Example 13 |
|---|---|---|---|---|---|---|---|---|---|
| Membrane-forming stock solution used | | | Example 1 | Example 2 | Example 3 | Example 4 | Example 5 | Example 6 | Example 1 |
| Hollow fiber membrane used | | | — | — | — | — | — | — | Example 7 |
| Washing liquid | Solvent (S) | Kind | — | — | — | — | — | — | Ethanol |
| | | Content (parts) | — | — | — | — | — | — | 80 |
| | Deionized water | Content (parts) | 100 | 100 | 100 | 100 | 100 | 100 | 20 |
| | Washing temperature (C.) | | 60 | 60 | 60 | 60 | 60 | 60 | 60 |
| Evaluation results for porous membrane | Content of polymer (B) (wt %) | | 40 | 39 | 38 | 29 | 31 | 31 | 9 |
| | Pure water flux ($m^3/m^2/MPa/hr$) | | 13 | 10 | 19 | 14 | 15 | 20 | 52 |

| | | | Example 14 | Example 15 | Example 16 | Example 17 | Example 18 | Example 19 | Example 20 |
|---|---|---|---|---|---|---|---|---|---|
| Membrane-forming stock solution used | | | Example 2 | Example 3 | Example 3 | Example 3 | Example 4 | Example 5 | Example 6 |
| Hollow fiber membrane used | | | Example 8 | Example 9 | Example 9 | Example 9 | Example 10 | Example 11 | Example 12 |
| Washing liquid | Solvent (S) | Kind | Ethanol | $DMA_C$ | Ethanol | $DMA_C$ | $DMA_C$ | $DMA_C$ | $DMA_C$ |
| | | Content (parts) | 80 | 50 | 80 | 30 | 30 | 30 | 30 |
| | Deionized water | Content (parts) | 20 | 50 | 20 | 70 | 70 | 70 | 70 |
| | Washing temperature (C.) | | 60 | 50 | 60 | 60 | 60 | 60 | 60 |
| Evaluation results for porous membrane | Content of polymer (B) (wt %) | | 10 | 11 | 16 | 0.2 | 0.5 | 1.1 | 0.8 |
| | Pure water flux ($m^3/m^2/MPa/hr$) | | 60 | 45 | 38 | 48 | 50 | 52 | 56 |

Comparative Example 6 to Comparative Example 9

Hollow fiber membranes were obtained in the same manner as in Example 7 except that those presented in Table 3 were used instead of the membrane-forming stock solution used in Example 7. The flux of pure water to permeate the hollow fiber membranes thus obtained and the content of the polymer (B') with respect to the sum of the membrane-forming polymer (A) and the polymer (B') to be contained in the porous membranes are presented in Table 4.

Comparative Example 10 and Comparative Example 11

Hollow fiber membranes were obtained in the same manner as in Example 13 except that those presented in Table 3 were used instead of the hollow fiber membrane and the washing liquid used in Example 13. The flux of pure water to permeate the hollow fiber membranes thus obtained and the content of the polymer (B') with respect to the sum of the membrane-forming polymer (A) and the polymer (B') to be contained in the porous membranes are presented in Table 4.

In the case of Comparative Example 10, since the polymer (B'-1) which did not contain a hydroxyl group-containing (meth)acrylate (b1) unit was used, the hydrophilicity was low, a favorable porous structure was not obtained, and the flux of pure water to permeate the hollow fiber membrane obtained after being washed with a 80% aqueous solution of DMAc was as low as 0.2 ($m^3/m^2$/MPa/h).

In the case of Comparative Example 11, since the polymer (B'-4) which did not contain a hydroxyl group-containing (meth)acrylate (b1) unit was used, the hydrophilicity was low, a favorable porous structure was not obtained, and the flux of pure water to permeate the hollow fiber membrane obtained after being washed with a 80% aqueous solution of ethanol was as low as 0.6 ($m^3/m^2$/MPa/h).

TABLE 4

| | | | Comparative Example 6 | Comparative Example 7 | Comparative Example 8 | Comparative Example 9 | Comparative Example 10 | Comparative Example 11 |
|---|---|---|---|---|---|---|---|---|
| | Membrane-forming stock solution used | | Comparative Example 1 | Comparative Example 2 | Comparative Example 3 | Comparative Example 4 | Comparative Example 1 | Comparative Example 4 |
| | Hollow fiber membrane used | | — | — | — | — | Comparative Example 6 | Comparative Example 9 |
| Washing liquid | Solvent (S) | Kind | — | — | — | — | Ethanol | Ethanol |
| | | Content (parts) | — | — | — | — | 80 | 80 |
| | Deionized water | Content (parts) | 100 | 100 | 100 | 100 | 20 | 20 |
| | Washing temperature (° C.) | | 60 | 60 | 60 | 60 | 60 | 60 |
| Evaluation results for porous membrane | Content of polymer (B) (wt %) | | 35 | 40 | Not formed | 9 | 24 | 3 |
| | Pure water flux ($m^3/m^2$/MPa/hr) | | 0 | 0 | Not formed | 0.3 | 0.2 | 0.6 |

As is apparent from the results of Table 3 and Table 4, the flux of pure water to permeate the hollow fiber membrane obtained in each of Examples was 10 ($m^3/m^2$/MPa/h) or more and less than 200 ($m^3/m^2$/MPa/h) and the hollow fiber membrane thus exhibited high water permeability. In addition, the porous membrane test piece obtained in each of Examples does not contain (meth)acrylic acid and thus hardly corrodes a metal.

Meanwhile, in the case of Comparative Example 6, since the polymer (B'-1) which did not contain a hydroxyl group-containing (meth)acrylate (b1) unit was used, the hydrophilicity was low, a favorable porous structure was not obtained, and the flux of pure water to permeate the hollow fiber membrane thus obtained was as low as 0 ($m^3/m^2$/MPa/h).

In the case of Comparative Example 7, since the polymer (B'-2) which did not contain a hydroxyl group-containing (meth)acrylate (b1) unit was used, the hydrophilicity was low, a favorable porous structure was not obtained, and the flux of pure water to permeate the hollow fiber membrane thus obtained was as low as 0 ($m^3/m^2$/M Pa/h).

In the case of Comparative Example 8, since the polymer (B'-3) which did not contain a methyl methacrylate unit was used, the polymer (B'-3) easily flowed out into the coagulating liquid, the membrane dissolved, and it was thus impossible to obtain a hollow fiber membrane. Hence, it was impossible to measure the flux of pure water to permeate the hollow fiber membrane.

In the case of Comparative Example 9, since the polymer (B'-4) which did not contain a hydroxyl group-containing (meth)acrylate (b1) unit was used, the hydrophilicity was low, a favorable porous structure was not obtained, and the flux of pure water to permeate the hollow fiber membrane thus obtained was as low as 0.3 ($m^3/m^2$/MPa/h).

INDUSTRIAL APPLICABILITY

According to the invention, it is possible to provide a porous membrane which exhibits high hydrophilicity and water permeability and hardly corrodes a metal. Consequently, the invention can be suitably used as a porous membrane and is industrially extremely important.

EXPLANATIONS OF LETTERS OR NUMERALS

1 Manufacturing apparatus
2 Stock solution feeder
3 Coating unit
4 Support
5 Coagulating bath
6 Hollow fiber membrane precursor

The invention claimed is:
1. A porous membrane, comprising:
a membrane-forming polymer (A); and
a polymer (B) comprising a methyl methacrylate unit and from 20 to 60% by mass of a hydroxyl group-containing (meth)acrylate (b1) unit based on the total mass of the polymer (B),
wherein the polymer (B) is a random copolymer.
2. The membrane of claim 1, wherein a flux of pure water to permeate the porous membrane is 10 ($m^3/m^2$/MPa/h) or more and less than 200 ($m^3/m^2$/MPa/h).
3. The membrane of claim 1, wherein a contact angle of the bulk of the membrane-forming polymer (A) is 60° or more.
4. The membrane of claim 1, wherein the membrane-forming polymer (A) is a fluorine-containing polymer.
5. The membrane of claim 1, wherein the hydroxyl group-containing (meth)acrylate (b1) unit comprises 2-hydroxyethyl (meth)acrylate, 2-hydroxypropyl (meth)acrylate,

2-hydroxybutyl (meth)acrylate, 3-hydroxybutyl (meth)acrylate, 4-hydroxybutyl (meth)acrylate, polyethylene glycol (meth)acrylate, and/or polypropylene glycol (meth)acrylate.

6. The membrane of claim 1, wherein the polymer (B) further comprises a monomer (b2) unit.

7. The membrane of claim 6, wherein the other monomer (b2) unit is a (meth)acrylate unit comprising nitrogen.

8. The membrane of claim 7, wherein the (meth)acrylate unit comprising nitrogen is either a unit of dimethylaminoethyl methacrylate or a quaternary salt of dimethylaminoethyl methacrylate.

9. The membrane of claim 6, wherein the methyl methacrylate unit, the hydroxyl group-containing (meth)acrylate (b1) unit, and the other monomer (b2) unit in the polymer (B) are all methacrylate units.

10. The membrane of claim 6, wherein the methyl methacrylate unit is from 20 to 60% by mass, and the monomer (b2) unit is from 1 to 60% by mass in the polymer (B).

11. The membrane of claim 6, wherein a molecular weight of the monomer (b2) constituting the polymer (B) is 300 or less.

12. The membrane of claim 1, wherein a proportion of the polymer (B) with respect to a sum of the membrane-forming polymer (A) and the polymer (B) in the porous membrane is from 0.1 to 40% by mass.

13. The membrane of claim 1, wherein a contact angle of an outer surface of the porous membrane to pure water is from 1 to 70°.

14. The membrane of claim 1, wherein an average pore diameter of a surface of the porous membrane is 300 nm or less.

15. The membrane of claim 14, wherein an average pore diameter of a surface of the porous membrane is 150 nm or less.

16. The membrane of claim 1, wherein a shape of the porous membrane is a hollow fiber shape.

17. A water treatment apparatus, comprising the membrane of claim 16.

18. A method of manufacturing a porous membrane, the method comprising:
coagulating a membrane-forming stock solution comprising a membrane-forming polymer (A), a polymer (B) comprising a methyl methacrylate unit and from 20 to 60% by mass of a hydroxyl group-containing (meth) acrylate (b1) unit based on the total mass of the polymer (B), and a solvent,
wherein the polymer (B) is a random copolymer.

19. The method of claim 18, wherein the polymer (B) does not comprise a (meth)acrylic acid unit.

20. The membrane of claim 1, wherein the polymer (B) does not comprise a (meth)acrylic acid unit.

21. The membrane of claim 1, wherein a flux of pure water to permeate the porous membrane is 10 ($m^3/m^2$/MPa/h) or more and less than 200 ($m^3/m^2$/MPa/h),
wherein a contact angle of the bulk of the membrane-forming polymer (A) is 60° or more, and
wherein an average pore diameter of a surface of the porous membrane is 300 nm or less.

22. The membrane of claim 2, wherein the polymer (B) further comprises a monomer (b2) unit, and
wherein the methyl methacrylate unit is from 20 to 60% by mass, and the monomer (b2) unit is from 1 to 60% by mass in the polymer (B).

23. The membrane of claim 22, wherein the other monomer (b2) unit is a (meth)acrylate unit comprising nitrogen.

24. The membrane of claim 1, wherein the polymer (B) comprises more than 95% of methyl methacrylate, the hydroxyl group-containing (meth)acrylate (b1), and optionally a further monomer (b2),
wherein the further monomer (b2) is ethyl (meth)acrylate, n-propyl (meth)acrylate, isopropyl (meth)acrylate, n-butyl (meth)acrylate, isobutyl (meth)acrylate, t-butyl (meth)acrylate, isoamyl methacrylate, hexyl (meth)acrylate, octyl (meth)acrylate, nonyl (meth)acrylate, decyl (meth)acrylate, undecyl (meth)acrylate, lauryl (meth)acrylate, tridecyl (meth)acrylate, tetradecyl (meth)acrylate, pentadecyl (meth)acrylate, phenyl (meth)acrylate, benzyl (meth)acrylate, glycidyl (meth) acrylate, 2-ethylhexyl (meth)acrylate, methoxyethyl methacrylate, ethoxyethyl (meth)acrylate, n-butoxyethyl (meth)acrylate, isobutoxyethyl (meth)acrylate, t-butoxyethyl (meth)acrylate, phenoxyethyl (meth) acrylate, nonylphenoxyethyl(meth) acrylate, 3-methoxybutyl (meth)acrylate, methoxypolyethylene glycol methacrylate with a 2 ethylene glycol chain, methoxypolyethylene glycol methacrylate with a 4 ethylene glycol chain, dimethylaminoethyl methacrylate, chloride salt of dimethylaminoethyl methyl methacrylate, methacrylic acid dimethyl amino ethyl methyl sulfate, 3-(methacrylamido)propyltrimethyl ammonium chloride, 3-(methacrylamido)propyltrimethylammonium methyl sulfate, and/or a quaternary salt of dimethylaminoethyl methacrylate.

* * * * *